United States Patent
Arfaa

(10) Patent No.: US 7,502,827 B2
(45) Date of Patent: Mar. 10, 2009

(54) SYSTEM AND METHOD FOR COMMUNICATION BETWEEN MOTORISTS IN AUTOMOBILES USING LICENSE PLATE INFORMATION

(76) Inventor: Babak E. Arfaa, 2310 Cullum Rd., Bel Air, MD (US) 21015

( * ) Notice: Subject to any disclaimer, the term of this patent is extended or adjusted under 35 U.S.C. 154(b) by 1434 days.

(21) Appl. No.: 09/846,206

(22) Filed: May 2, 2001

(65) Prior Publication Data

US 2007/0043812 A1    Feb. 22, 2007

Related U.S. Application Data

(60) Provisional application No. 60/201,316, filed on May 2, 2000.

(51) Int. Cl.
- *G06F 15/16* (2006.01)
- *G06Q 10/00* (2006.01)
- *G06F 17/30* (2006.01)
- *H04M 3/42* (2006.01)

(52) U.S. Cl. ............................ 709/206; 705/1; 707/10; 455/414.1

(58) Field of Classification Search ........................ None
See application file for complete search history.

(56) References Cited

U.S. PATENT DOCUMENTS

| | | | | |
|---|---|---|---|---|
| 5,844,987 | A * | 12/1998 | Matthews et al. | 340/901 |
| 6,269,372 | B1 * | 7/2001 | Wertheim | 707/10 |
| 6,339,736 | B1 * | 1/2002 | Moskowitz et al. | 701/29 |
| 2001/0034768 | A1 * | 10/2001 | Bain et al. | 709/206 |
| 2004/0162064 | A1 * | 8/2004 | Himmelstein | 455/422.1 |
| 2004/0209601 | A1 * | 10/2004 | Obradovich et al. | 455/414.1 |
| 2004/0236792 | A1 * | 11/2004 | Celik | 707/104.1 |

FOREIGN PATENT DOCUMENTS

KR    2001064658 A  *  7/2001

* cited by examiner

*Primary Examiner*—Wen-Tai Lin
(74) *Attorney, Agent, or Firm*—Whiteford, Taylor & Preston LLP; Jeffrey C. Maynard

(57) ABSTRACT

A system for sending electronic messages (data, voice, picture, or other) to specific motorists or motor vehicles using their license plate information is disclosed. Internet, wireless email, and instant messaging systems provide much of the core competency of the system. Proximity messaging systems between motorists and/or motor vehicles that are near each other are also disclosed. Examples of private and public sector business models and methods of using such system are disclosed.

11 Claims, No Drawings

SYSTEM AND METHOD FOR COMMUNICATION BETWEEN MOTORISTS IN AUTOMOBILES USING LICENSE PLATE INFORMATION

CROSS REFERENCE TO RELATED APPLICATION

Applicant claims the benefit of provisional patent application Ser. No. 60/201,316, filed on May 2, 2000.

BACKGROUND OF INVENTION

1. Field of the Invention

The present invention essentially relates to Internet, telephone, wireless, and other communications that evolve out of making motor vehicles' license plate digits a means of contacting or engaging in communication with specific motor vehicles, motor vehicle owners, and/or motorists. It also relates to methods of doing business intended to create revenue via facilitating communication between people who know of each other essentially only from traveling . . . by car, by foot, by train, or by other means.

2. Background to the Invention

There is no prior art that makes contacting, nor communicating with, specific motor vehicles, motor vehicle owners, and/or motorists via license plate digits.

The systems, procedures, apparatus', programs, and methods of doing business revolve around providing a service whereby the business arranges for contactability, connectivity, and makes possible further communication between people who do not know each other but from traveling essentially on roads, highways, etc. People who are not strangers might also find the services of this business useful.

BRIEF SUMMARY OF THE INVENTION

The invention essentially connects motor vehicles, their owners, and/or their drivers to individuals, institutions, or other things that want to contact them by way of the motor vehicle's license plate digits. This is done with Internet, telephone, wireless, and other systems.

The invention is useful because motorists can connect with each other specifically, as now they cannot.

The invention is useful because motor vehicle-related institutions (Departments of Motor Vehicles, Motor Vehicle Insurers, Manufacturers, etc.) can now correspond with motor vehicles, their owners, and/or drivers.

In a preferred embodiment this is done by creating systems, procedures, apparatus', programs, and methods to use them whereby people receive "license-plate" e-mail addresses and screen-names (from the aforementioned business) and use them to connect and communicate with one another. Contactability, connectivity, and communication will be provided through the business' systems, procedures, apparatus', programs, and methods to use. Examples of such are an e-mail repository which is accessible via "desktop" devices (Desktop Computers, Laptops, or others) or wireless devices (Laptops, Cell-Phones, Internet-Phones, Smart-phones, "PDA's", Pagers, etc. . . . ), instant messaging programs which are useable on both desktop or wireless devices, and infrared "blue-tooth" programs or other systems which allow for the immediate transmittal of information between devices on/within automobiles (i.e. zap your license plate e-mail address, or regular e-mail address, or other information from your car's database and into another's). All of these systems, procedures, apparatus', programs, and/or methods attain functionality and utility because they are identified by a license plate's information, or a vehicle's "vehicle identification number" ("V.I.N."), or even a time, place, or other identifier. This method of business makes possible further communication between people by arranging an infrastructure of contactability between people essentially based upon their license plate information (State, Alpha-Numeric's Digits, Registration Date, Clubs, etc.), and/or their V.I.N., or the date/day/time of their meeting, and/or the place of their meeting (possibly an intersection, possibly a train or station, possibly a county, state, etc.), or anything else that might signify the instance at which people have met.

Businesses and governments, and people under the employ of a business (or even self-employed) or under the employ of a government might find the method of doing business encompassing the following systems, procedures, apparatus, programs, and their respective methods of use, very useful to their own ends. For instance, I might want to order pizza from a pizza truck in front of me, or advertise my profession, or perpetually receive bids on my car, or buy a car from the salesman in front of me because he looks honest, all the way to having police officers rather to issue tickets/warnings through this system rather than step out into a dangerous highway or situation in general, etc.

DESCRIPTION OF EXEMPLARY EMBODIMENTS

The invention essentially connects motor vehicles, their owners, and/or their drivers to individuals, institutions, or other things that want to contact them by way of the motor vehicle's license plate digits. The invention makes such connectivity possible through an "electronic mail" ("e-mail") repository whereby motor vehicles can be assigned email address accounts according to their license plates. The invention makes such connectivity possible through Uniform Resource Locator (URLs) addresses located on the Internet, which URLs can be assigned to motor vehicles according the their license plate numbers. The invention makes such connectivity possible through an Internet "instant messenger" ("IM") whereby a motor vehicle can be contacted according to the username it is assigned according to its license plate. The invention makes such connectivity possible through telephone systems that make motor vehicles contactable by a means of dialing up the license plate. The invention makes such connectivity possible by other systems and devices that enable instant communication between a motor vehicle and other things around it. The invention makes such connectivity possible through address-algorithms for each of the said methods of enable motor vehicle connectivity.

In order to facilitate the regrouping and further communication between highway travelers (car/truck/motorcycle→car/truck/motorcycle; car/truck/motorcycle→jogger; jogger jogger; any traveler somewhere to any other traveler; etc.), this business will host an e-mail repository where e-mail addresses are essentially determined and disseminated according to one's license plate information (State, Alpha-Numeric Digits, Registration Date, Clubs, any other possible license plate identifiers, etc.) E-mail addresses may be set up by other criteria, such as V.I.N., time, place, or any other identifiers.

As such, this business calls for a system in the spirit of a license plate e-mail repository. This repository makes it particularly easy for automobile travelers to find each other through a "look up vehicle" ("LUV") technology service. With this service, an individual can set up a license plate e-mail address where messages are delivered to them if they are contacted by others (probably travelers) and where they can send messages to other license plate e-mail addresses, and even other regular e-mail address, if they so desire.

In order to facilitate the faster regrouping and further communication between highway travelers as outlined in the above paragraphs, this business will provide to certain users what has become commonly known as an "Internet Instant Messenger" (an "IM"). This IM will allow people to use one (1) or more than one screen-name at any one time, and up to one million (1,000,000) screen-names at any one time. This IM will allow users to show or hide their online presence to other IM users by showing or hiding any number of these screen names.

The purpose of this IM's system, procedure, apparatus, program, and method of use is essentially to allow users to seek each other (highway travelers) out as soon as they are online, and not to have to wait for a response to an e-mail message.

As such, a user is able to have his/her most desired, regular screen-name open (say for instance "scooter-mcdoo", or whatever a user might desire) in order to show their online presence to others in their regular IM community (also known as a group list, buddy list, etc. . . . ), and then also to allow for a second, a third, a fourth, a fifth, etc. screen-name(s) open which would usually be one's license plate digits ("Virginia-AJX-813", or anything similar which contains license plate information, or V.I.N., etc.) and which therefore makes one contactable by one or several regular screen-names, and/or by one or several license-plate screen name(s).

For instance, in the above paragraph, "scooter-mcdoo" is contactable by, and connectable to others who know him/her by that first screen-name, and can also be contacted by anyone else using an IM compatible with this IM who knows him/her as only the second screen-name "Virginia-AJX-813" (because "scooter-mcdoo" was driving or was seen in a car possessing the Virginia AJX-813 license plate, but the person who wishes to contact "scooter-mcdoo" only knows "scooter-mcdoo" by a license plate), and/or contacted by any other automobile he/she was driving or inside of, and/or by any other screen-name he/she may wish to use, up to one million (1,000,000) names. Large numbers of screen names will probably be most useful to corporate, club, or government fleets. Other identifiers besides license plate information (V.I.N., time/place/other significant identifiers such as bumper stickers) can be used too.

This business will also host "chat rooms" which provide similar connectivity (by license plate; V.I.N., time; place; other; etc. . . . ) if the IM above proves not fully capable of connecting the intended parties.

Voice messaging, faxing, and short messaging services will be incorporated into any of the aforementioned systems, procedures, apparatus', programs, methods of using, as a service offered and method of doing business.

Another method of doing business which is proprietary to what is revealed in this invention is one where anyone (individual, group, company, government, or government agent, or anyone) transacts their business through or because of the systems, procedures, apparatus', programs, and their methods of use as described in this application. (McDonald's→Cars; Exxon→Cars; Dry-Cleaners→Cars; Toll Booth→Cars; etc.)

What is claimed is:

1. A system for communicating with a motorist, comprising:
   a repository of electronic addresses in which a vehicle is assigned an electronic address according to its license plate registration number, wherein the electronic address includes the license plate registration number; and
   a messaging service that enables a motorist associated with the vehicle to send and/or receive messages using the electronic address from said repository of electronic addresses via a wireless communication system.

2. The system of claim 1, wherein an algorithm coordinates a plurality of electronic addresses in the repository for the motorist, at least one of the electronic addresses includes a license plate registration number.

3. The system of claim 1, wherein the motorist can simultaneously communicate over each of said plurality of electronic addresses.

4. The system of claim 1, wherein the electronic address is standardized for use with email, instant messaging, or telephone communication.

5. A system for communicating with a motorist, comprising:
   a repository in which a vehicle is assigned a telephone address according to its license plate registration number, wherein said telephone address includes the license plate registration number; and
   a telephone service system that enables a motorist associated with the vehicle to be directly contacted at the telephone address assigned from said repository.

6. The system of claim 5, wherein said telephone address comprises a cellular phone number.

7. A computer-implemented method of providing communication to an electronic account, said method comprising:
   establishing a repository that is accessible via an electronic device connected to a network;
   populating said repository with license plate information;
   creating an electronic account having an electronic address based on said license plate information, wherein the electronic address includes a license plate registration number associated with a vehicle; and
   enabling said electronic account as a destination address and/or originating address for a plurality of communication methods.

8. The computer-implemented method of claim 7, wherein said communication method comprises email.

9. The computer-implemented method of claim 7, wherein said communication method comprises instant messaging.

10. The computer-implemented method of claim 7, wherein said communication method comprises telephone communication.

11. The computer-implemented method of claim 7, wherein said license plate information comprises a registration number and state of issue.

* * * * *